(12) United States Patent
Xiao et al.

(10) Patent No.: US 12,389,055 B2
(45) Date of Patent: Aug. 12, 2025

(54) INTEREST BASED RECOMMENDATION SYSTEM

(71) Applicant: ROKU, INC., San Jose, CA (US)

(72) Inventors: Fei Xiao, San Jose, CA (US); Ronica Jethwa, Mountain View, CA (US); Jing Ye, San Jose, CA (US); Abhishek Bambha, Burlingame, CA (US); Zidong Wang, San Jose, CA (US); Jose Sanchez, San Jose, CA (US); Nam Vo, San Jose, CA (US); Khaldun Aidarabsah, San Jose, CA (US); Pulkit Aggarwal, San Jose, CA (US); Lian Liu, San Jose, CA (US); Anirban Das, San Jose, CA (US); Rohit Mahto, San Jose, CA (US)

(73) Assignee: Roku, Inc., San Jose, CA (US)

( * ) Notice: Subject to any disclaimer, the term of this patent is extended or adjusted under 35 U.S.C. 154(b) by 169 days.

(21) Appl. No.: 18/089,343

(22) Filed: Dec. 27, 2022

(65) Prior Publication Data
US 2024/0214619 A1    Jun. 27, 2024

(51) Int. Cl.
*H04N 21/25* (2011.01)
*H04N 21/24* (2011.01)
*H04N 21/472* (2011.01)

(52) U.S. Cl.
CPC ....... *H04N 21/252* (2013.01); *H04N 21/2407* (2013.01); *H04N 21/472* (2013.01)

(58) Field of Classification Search
CPC ............. H04N 21/252; H04N 21/2407; H04N 21/472; H04N 21/4668; H04N 21/4532; H04N 21/4826; H04N 21/44224; H04N 21/4312; H04N 21/251; H04N 21/431; H04N 21/466; H04N 21/4661; H04N 21/4755; H04N 21/4758; H04N 21/482; H04N 21/25891
USPC .......................................... 725/14
See application file for complete search history.

(56) References Cited

U.S. PATENT DOCUMENTS

| | | | | |
|---|---|---|---|---|
| 2011/0320471 | A1* | 12/2011 | Hiroi .................. | H04N 21/4826 707/767 |
| 2014/0032698 | A1* | 1/2014 | Hsu ..................... | H04N 21/2408 709/213 |
| 2014/0282709 | A1* | 9/2014 | Hardy ................ | H04N 21/6181 725/34 |
| 2015/0095329 | A1* | 4/2015 | Sanio ..................... | G06F 16/48 707/732 |

(Continued)

*Primary Examiner* — Cynthia M Fogg
(74) *Attorney, Agent, or Firm* — Sterne, Kessler, Goldstein & Fox P.L.L.C.

(57) ABSTRACT

A set of content items can be accessed by a community of users having a set of interests. A set of interest based clusters for the set of content items correspond to the set of interests. For a user, a recommendation system can determine a group of user interest clusters selected from the set of interest based clusters. A popularity score for each content item of the set of content items with respect to the community of users can be generated, and an interest based popularity score for a content item within the interest based cluster can be generated based on a rank of the content item based on the popularity score of the content item. Recommendation candidates for the user can be generated based on the interest based popularity score of the content item for each content item in the group of user interest clusters.

20 Claims, 5 Drawing Sheets

(56) References Cited

U.S. PATENT DOCUMENTS

| | | | |
|---|---|---|---|
| 2015/0331951 A1* | 11/2015 | Wang | G06F 16/2457 707/722 |
| 2016/0092581 A1* | 3/2016 | Joshi | G06F 16/9535 707/732 |
| 2016/0255170 A1* | 9/2016 | Gargi | H04L 67/306 709/204 |
| 2019/0205373 A1* | 7/2019 | Walsh | H04N 21/435 |
| 2019/0222899 A1* | 7/2019 | Chen | H04N 21/251 |
| 2021/0076089 A1* | 3/2021 | Miller | H04N 21/4668 |
| 2023/0014995 A1* | 1/2023 | Sharma | H04N 21/4532 |

* cited by examiner

INTEREST BASED RECOMMENDATION SYSTEM

BACKGROUND

Field

This disclosure is generally directed to recommendation systems in a multimedia environment, and more particularly to interest based recommendation systems.

Background

Traditionally, television (TV) offers viewers access to content, which may be TV content or multimedia content, via subscription to cable or satellite services or through over-the-air broadcasts. In general, content can be delivered from a content source device operated by a content provider to millions of viewers to be displayed by TV devices. TV content has been offered to the viewers in a linear way in which viewers can only consume the content and watch programs according to a broadcaster programming schedule.

With the advanced technology, TV content or multimedia content such as movies can be delivered via the Internet or other channels to various media devices in a live stream format without the involvement of cable or satellite service providers. For example, TV content or multimedia content delivered in such stream format can be provided by over-the-top television (OTT) or free ad-supported streaming (FAST) TV. With the content delivered in stream format, viewers can have many choices on what content items to watch. With millions of content items available in a multimedia environment provided by a service provider, a content recommendation system, or simply referred to as a recommendation system, is normally used to recommend content items to a viewer so that the viewer can watch content items selected among the recommend content items. Accordingly, viewer experience depends on the performance of the recommendation system used to recommend the content items to the viewers.

SUMMARY

Provided herein are system, apparatus, article of manufacture, method and/or computer program product embodiments, and/or combinations and sub-combinations thereof, for an interest based content recommendation system selecting one or more recommendation candidates for a user, where the one or more recommendation candidates may be selected from a set of content items based on interest based popularity score of the content item for the user.

In some embodiments, a set of content items can be accessed by a community of users, such as the users of a service provider, and a recommendation system can generate one or more recommendation candidates for a user of the community of users. In detail, the community of users have a set of interests, and the recommendation system can generate a set of interest based clusters for the set of content items corresponding to the set of interests for the community of users. An interest based cluster includes a subset of content items corresponding to an interest of the set of interests. For a user of the community of users, the recommendation system can determine, based on a viewing history of content items for the user, a group of user interest clusters selected from the set of interest based clusters.

In some embodiments, the recommendation system can generate a popularity score for each content item of the set of content items with respect to the community of users. The popularity score for each content item of the set of content items is determined with respect to the community of users, which may be related to a summarization of the content item being viewed by the entire community of users. The recommendation system can further generate an interest based popularity score for a content item within the interest based cluster, which can be a rank for the content item within the subset of content items of the interest based cluster based on the popularity score of the content item. The recommendation system can recommend the one or more recommendation candidates to the user based on the interest based popularity score of the content item for each content item in the group of user interest clusters.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
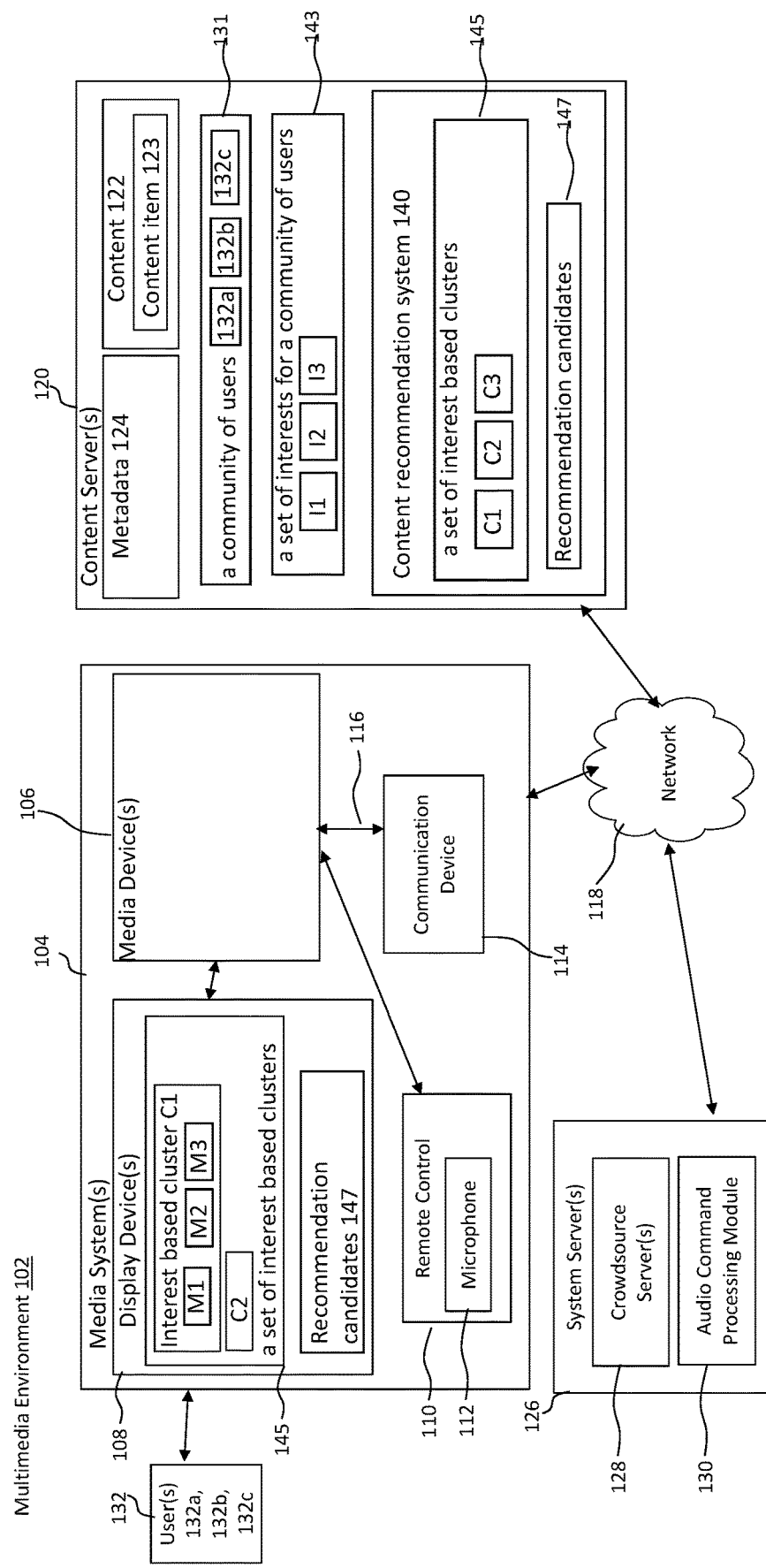
FIG. 1 illustrates a block diagram of a multimedia environment, according to some embodiments.

Provided herein are system, apparatus, device, method and/or computer program product embodiments, and/or combinations and sub-combinations thereof, for an interest based recommendation system selecting one or more recommendation candidates for a user, where the one or more recommendation candidates may be selected from a set of content items based on interest based popularity score of the content item for the user.

In some embodiments, a recommendation system may arrange the recommended content items to a user by a number of rows displayed on a display device, where each row may include content items of a category. For example, a recommendation system for a multimedia environment including movies may arrange the movies by their genres or sub-genres in each row. However, a genre or a sub-genre of a movie, such as action, comedy, drama, fantasy, horror, mystery, romance, thriller, and western, may be defined based on the content of the movie with respect to all the population of the society. For example, a comedy movie is always treated as a comedy movie to anyone in the world. Such an arrangement of rows of content items based on genres or sub-genres may not be able to target individual users, leading to a less effective recommendation system.

In some embodiments, a recommendation system may group similar items together according to interests, where an interest may be selected from a set of interests for a community of users. Accordingly, a community of users can have an interest different from a genre or a sub-genre of a movie. For example, an interest may be defined based on information related to music, education, location, culture, age, or social factors of the content item. Compared to a genre or sub-genre, an interest may be more narrowly defined related to a user or a community of users. Accordingly, a recommendation system grouping or clustering similar items together according to interests can be more targeted towards a user or a user community, leading to a more effective recommendation system. In detail, more rows of content items based on interests can be displayed on a display device as a set of interest based clusters. Instead of grouping based on genre, interest based clusters can help user users to discover more easily the content items they like, improving user experience. Content items, such as movies, can be clustered into different interest based clusters, each interest based cluster representing an interest, based on the content item embedding generated by user-item interactions. In some embodiments, a same content item can belong to multiple different interest based clusters. Furthermore, based on a viewing history of content items for a user, a recommendation system can determine the user's interests, and further determine a group of user interest clusters selected from the set of interest based clusters for the community of users. The group of user interest clusters can be more specifically targeted to the user's interests instead of the interests of the community of users.

For some recommendation systems, popularity may be a key metric used for candidate selection, ranking, and displaying the one or more recommendation candidates to a user. However, popularity, which may be measured by a popularity score of a content item with respect to a community of users, may be biased by the more active users' preferences. If most users like crime drama and sitcom, movies for crime drama and sitcom may be the most popular content items. Such a popularity score of a content item may negatively impact users who like science fiction and animation when the popularity score of a content item is used for candidate selection and ranking. In some embodiments, with the interest based clusters generated above, instead of using the popularity score of a content item with respect to a community of users, an interest based popularity score can be defined with respect to a user's interest. The recommendation system can select one or more recommendation candidates for a user based on the interest based popularity score of the content item for each content item in the group of user interest clusters. Accordingly, a user who likes science fiction and animation can find more items in the candidate selection based on the interest based popularity score.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. Users 132, which may represent multiple users 132a, 132b, 132c, and more, may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IOT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include multiple content items 123, which may be any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

In some embodiments, content server 120 may also store information about a community of users 131, which can include user(s) 132 such as user 132a, 132b, 132c, or more. The community of users 131 may share a set of interests 143, such as interest I1, interest I2, interest I3, and more. Content server 120 can implement a content recommendation system, or simply a recommendation system 140. Recommendation system 140 can generate a set of interest based clusters 145, including an interest based cluster C1, an interest based cluster C2, an interest based cluster C3, and more, for a set of content items 123 corresponding to the set of interests 143 for the community of users 131. An interest based cluster, such as C1, C2, C3, includes a subset of content items corresponds to an interest of the set of interests. For example, interest based cluster C1 corresponds to interest I1, interest based cluster C2 corresponds to interest I2, and interest based cluster C3 corresponds to interest I3. Recommendation system 140 can further have the interest based clusters, such as interest based cluster C1 and interest based cluster C2 displayed on display device 108 in adjacent positions, where interest based cluster C1 is shown to include various content items, such as movie M1, M2, M3. Similarly, interest based cluster C2 can include a second subset of content items 123. In some embodiments, a content item, such as a movie, can be included in multiple interest based clusters. Recommendation system 140 can select one or more recommendation candidates 147 to user 132a for content items in the group of user interest clusters, with more details shown in FIGS. 3-4.

In some embodiments, interest based cluster C1 and interest based cluster C2 include a subset of content items. Accordingly, interest based clusters can be used to divide content item 123 into different sets, groups, or classes. However, interest based clusters can be different from classifying content items by genre or sub-genre. For example, an interest may be defined based on information related to music, education, location, culture, age, or social factors of the content item, such as a movie for an interest as Korean language movie for people around 45-55 years old with slow music. Compared to a genre or sub-genre, an interest may be more narrowly defined related to a user or a community of users. Accordingly, a recommendation system grouping or clustering similar items together according to interests can be more targeted towards a user or a user community, leading to a more effective recommendation system. In some embodiments, an interest can also include a genre or a sub-genre. In some embodiments, the set of interest based clusters 145 can be generated offline before recommendation system 140 is used by a user, and the set of interest based clusters 145 can be stored in a storage device so that recommendation system 140 can use the set of interest based clusters 145 when interacting with the user without any delay to compute the set of interest based clusters 145.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the verbal command of user 132. The audio command processing module 130 may then forward the verbal command back to the media device 106 for processing.

Figure 2:
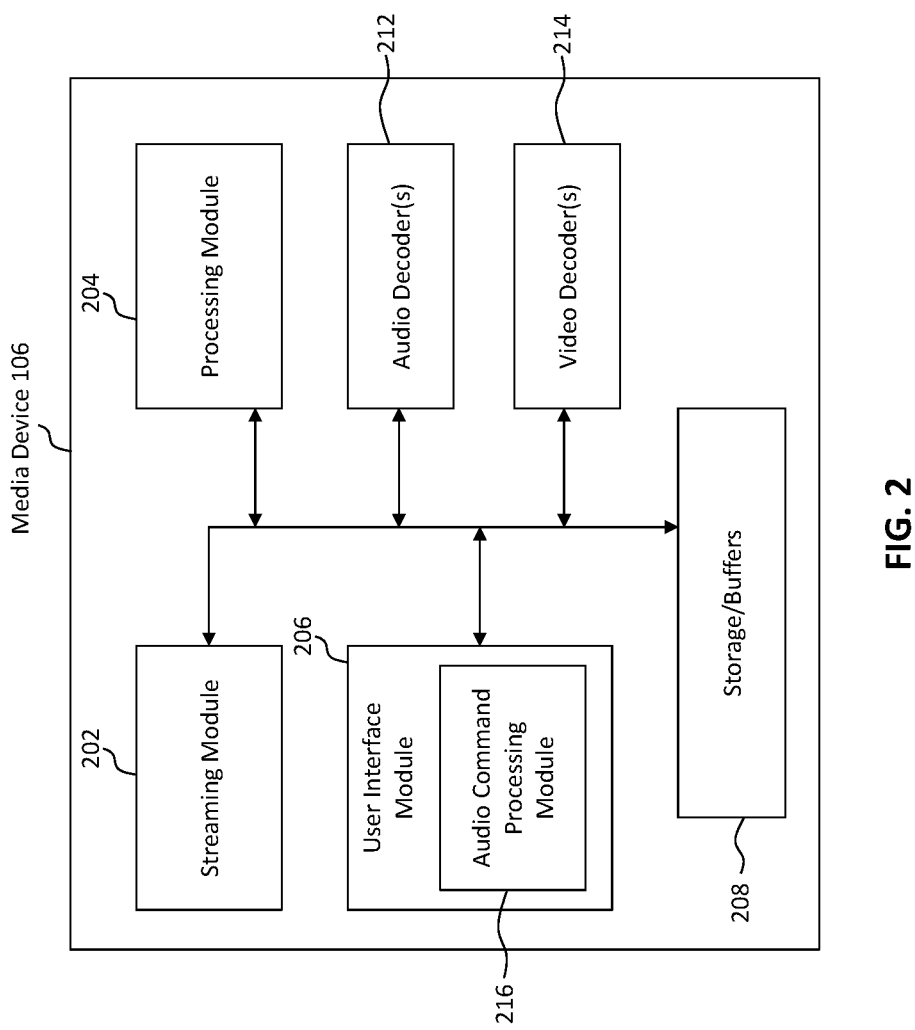
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, H.265, AV1, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Recommendation System

Figure 3:
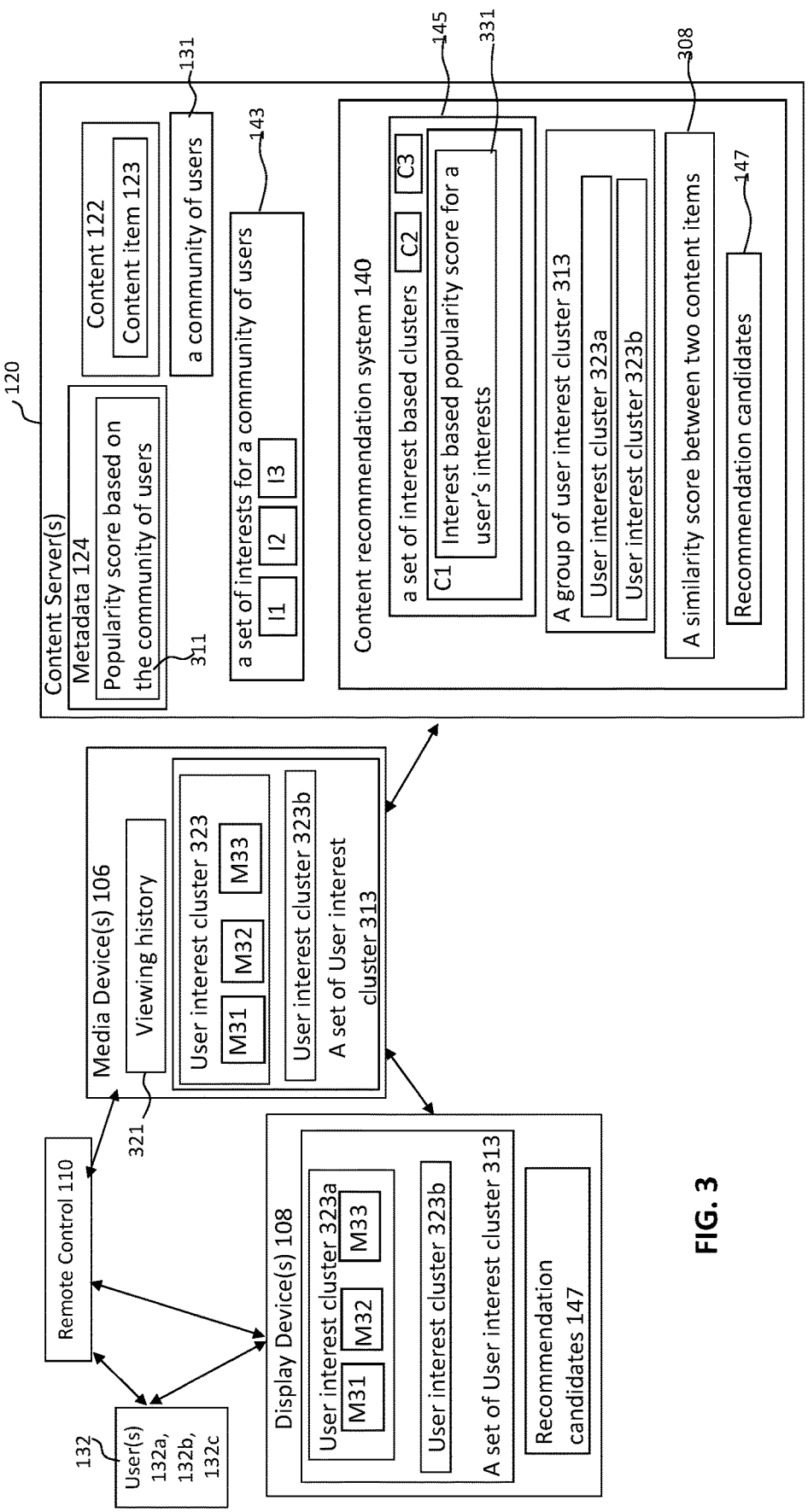
FIG. 3 is a block diagram illustrating a recommendation system selecting one or more recommendation candidates for a user, according to some example embodiments.

FIG. 3 is a block diagram illustrating recommendation system 140 selecting one or more recommendation candidates for a user, according to some example embodiments. Recommendation system 140 can organize content items 123 into various clusters, such as the set of interest based clusters 145 as shown in FIG. 1, which provides organized display of the set of interest based clusters 145 on display device 108. From the organized display of the set of interest based clusters 145, a user may identify and select, in a way more efficient than being organized by the traditional genre-based display, one or more of the content items for purchase, viewing, posting, listening to, sharing, access, or other use or consumption.

In some embodiments, content items 123 may include multimedia, such as television shows, books, video games, movies, music, music videos, lectures, pictures, images, and/or art that may be selected for consumption by a user. In other embodiments, content items 123 may include any type of data files.

In some embodiments, content items 123 may include a group or set of unclustered files stored across one or more computing devices. In some embodiments, content items 123 may include information that may be used to sort the content items. Example information incudes title, by date of release or availability, the name of the studio/author/artist, file size, and length of content. The ability to sort content items 123 by name or other data is generally only helpful to a user who already knows what content item 123 for which they are looking.

In some embodiments, as discussed above, user 132a may operate media device 106 to watch or consume content items 123, using remote control 110. Media device 106 may include any device that allows the user to stream, purchase, rent, or download content items 123. In some embodiments, media device 106 may be connected (wired or wirelessly) to display device 108, such as a monitor or television. In some embodiments, media device 106 may be integrated into display device 108 (or vice versa), as a single device, such as a SMART television, laptop/tablet computer, or Internet of Things (IOT) device with one or more streaming media services through which user 132a may select and consume various content items 123. In some embodiments, media device 106 may include an app on a mobile phone, tablet, or laptop (e.g., display device 108—which may include a keyboard or interface that is used as remote control 110) which user 132a may use to watch content items 123.

When user 132a logs in to media device 106 or otherwise indicates an interest in viewing content items 123, media device 106 may provide a view or display of content items 123 to user 132a, via display device 108. However, rather than providing a random assortment of content items or content items simply sorted by name or date of addition, recommendation system 140 may organize or cluster content items 123 into relevant groupings. In some embodiments, recommendation system 140 may be implemented by media device 106 or content server 120, individually or in combination.

In some embodiments, content items 123 may include data and/or metadata 124 that may be used to compare two different content items 123 for similarities/differences. In some embodiments, metadata 124 may include user comments, the names of actors or artists involved in developing or creating the content item, title, studio/publisher, text of audio/speech of the content item, storylines, a history of previous clusterings, length, rating information (e.g., rated R, PG-13, parental advisory, etc.).

In some embodiments, metadata 124 (and/or other available data or information) may be used to compute or generate a similarity score 308 between two different content items 123. Similarity score 308 may indicate a degree or measure of similarity between two or more different content items 123. In some embodiments, similarity score 308 may be between a cluster or grouping of multiple content items 123 and another unclustered content item 123. In some embodiments, similarity score 308 may be a measure between two different clusters or groups of content items 123 (which may or may not include one or more overlapping content items 123). In some embodiments, similarity score 308 may be obtained based on item embedding for content items 123, and similarity score 308 between the first selected content item and the second selected content item represents a likely possibility for user 132a to display the first selected content item as well as the second selected content item.

Examples of content items 123 are illustrated on display device 108 as numbered boxes M31, M32, M33, or more. M31-M33 may be examples of different movies, however it is understood in other embodiments any multimedia files or data files may be used as described herein in addition to or in lieu of movies. For example, recommendation system 140 may have compared M31 to M32 to determine a similarity score 308 for the pairing. And those pairings for which the similarity score 308 exceeding a threshold may have been merged, grouped, organized, or clustered together as described herein.

In some embodiments, recommendation system 140 may allow for a single content item 123 to be clustered into multiple interest based clusters by moving a copy of the content item 123 (or a pointer to the content item) into a cluster. For example, if a movie "Star Trek" is paired with another movie "Star Wars", and similarity score 308 exceeds a threshold, the two movies may be clustered together into a "Star Wars" cluster. However "Star Trek" may still compared to other movies during operations, even after it has been clustered together with "Star Wars". For example, "Star Trek" may be compared to other movies such as "Gremlins", "Romancing the Stone", and "Star Gate".

It may be determined that "Star Trek" has a similarity score 308 with "Star Gate" that exceeds the threshold, and the two movies may be merged together into a "Star Gate" cluster. Afterwards, the Star Wars cluster (including both Star Wars and Star Trek), the Star Gate cluster (including both Star Trek and Star Gate), Gremlins, and Romancing the Stone may all be compared for further or additional clustering.

Figure 4:
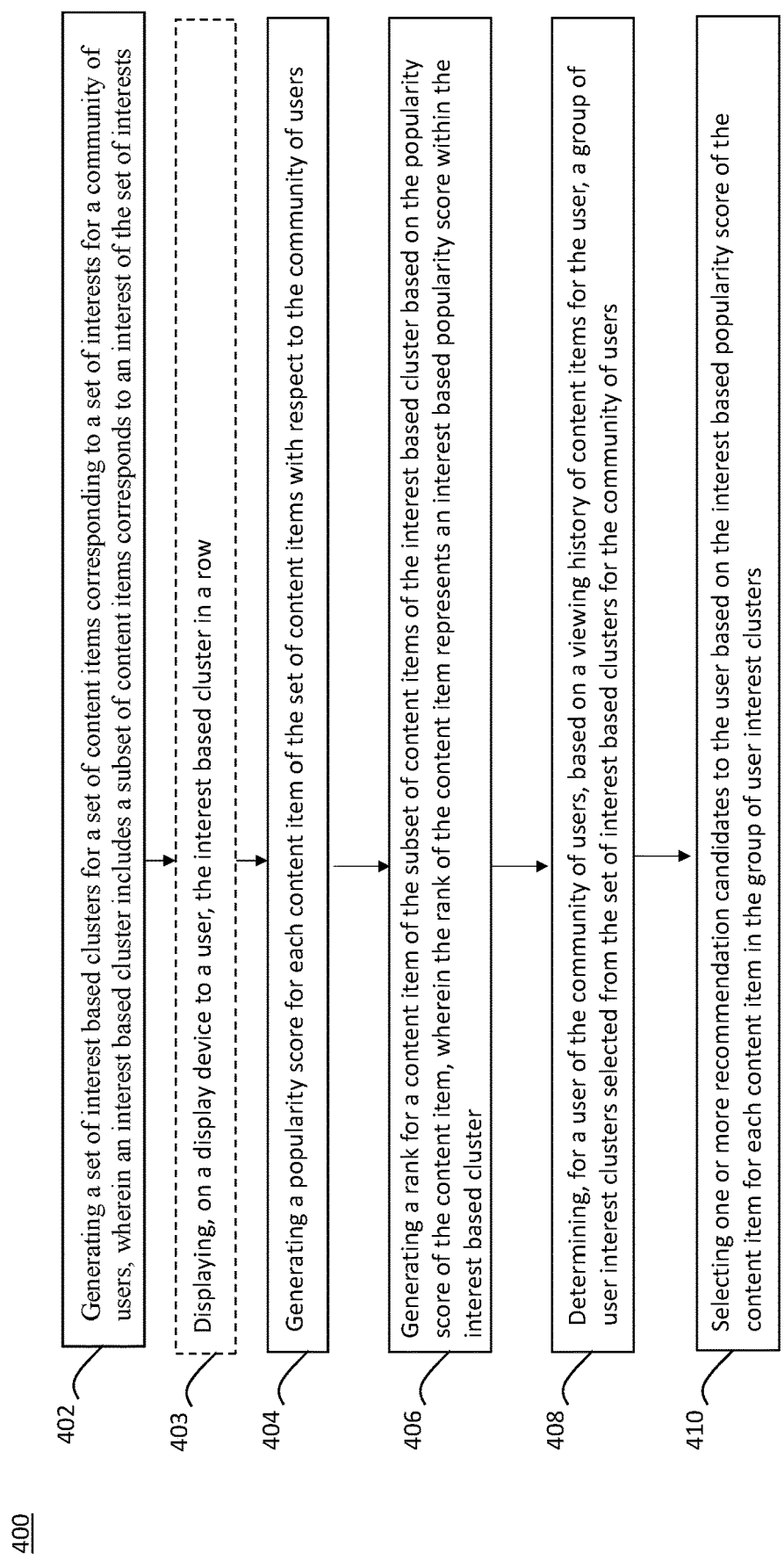
FIG. 4 is a flowchart illustrating an example process by a recommendation system for selecting one or more recommendation candidates for a user, according to some embodiments.

FIG. 4 illustrates process 400 performed by recommendation system 140 for selecting one or more recommendation candidates for a user. Process 400 can be performed by processing logic that can comprise hardware (e.g., circuitry, dedicated logic, programmable logic, microcode, etc.), software (e.g., instructions executing on a processing device), or a combination thereof. In some embodiments, recommendation system 140 may operate across multiple different computing devices simultaneously, or in parallel, thus reducing the amount of time that may be used for operations shown in process 400. It is to be appreciated that not all steps may be needed to perform the disclosure provided herein. Further, some of the steps may be performed simultaneously, or in a different order than shown in FIG. 4, as will be understood by a person of ordinary skill in the art. Process 400 shall be described with reference to FIG. 3. However, process 400 is not limited to that example embodiment.

Recommendation system 140 can organize content items 123 into various clusters, such as the set of interest based clusters 145 as shown in FIG. 1, and provides organized display of the set of interest based clusters 145 on display device 108. Compared to the traditional way to organize content items 123 by genres or sub-genres, content items organized by the set of interest based clusters 145 is more efficient because an interest based cluster C1 can be more narrowly targeted to interest I1 of the community of users 131. However, recommendation system 140 can be further optimized by organizing content items 123 according to a group of user interest clusters 313 as shown in FIG. 3, which can be a subset of the set of interest based clusters 145. The set of interest based clusters 145 is arranged based on the set of interests 143 for the community of users 131. A user interest cluster 323 of the group of user interest clusters 313 can be further narrowed to target a specific user 132*a* within the community of users 131, leading to more efficient organization for the specific user 132*a*.

In some embodiments, at 402, recommendation system 140 may generate a set of interest based clusters for a set of content items corresponding to a set of interests for a community of users, where an interest based cluster includes a subset of content items corresponds to an interest of the set of interests. For example, recommendation system 140 may generate the set of interest based clusters 145 for content items 123 corresponding to the set of interests 143 for the community of users 131. An interest based cluster, such as C1, can include a subset of content items 123 corresponding to an interest of the set of interests 143.

In some embodiments, at 403, optionally, recommendation system 140 may display, on a display device to a user, the interest based cluster in a row. One or more rows of content items based on interests can be displayed on the display device as a set of interest based clusters. Instead of grouping based on genre, interest based clusters can help user to discover more easily the content items they like, improving user experience. Multiple rows displaying multiple interest based clusters on the display device can be arranged according to an order based on a personalized row ranking model applied to the multiple rows. In some embodiments, new recommendation rows based on interest clustering can be generated and displayed on the display device, where the row name could be generated or predicted based on metadata of the items in the rows.

In some embodiments, at 404, recommendation system 140 may generate a popularity score for each content item of the set of content items with respect to the community of users. For example, recommendation system 140 may generate a popularity score 311 for each content item of the set of content items 123 with respect to the community of users 131. In some embodiments, the popularity score 311 of the content item with respect to the community of users 131 is defined based on a total streaming time by the community of users 131, a total number of displays by the community of users 131, a total number of clicks by the community of users 131, or a number of reaches for the content item by the community of users 131. Other ways to define the popularity score 311 of the content item with respect to the community of users 131 can be used as well.

In some embodiments, at 406, recommendation system 140 may generate a rank for a content item of an interest based cluster based on the popularity score of the content item, where the rank of the content item represents an interest based popularity score within the interest based cluster. For example, recommendation system 140 may generate a rank for a content item of the interest based cluster C1 based on the popularity score 311 of the content item, where the rank of the content item represents an interest based popularity score 331 within the interest based cluster C1.

In some embodiments, at 408, recommendation system 140 may determine, for a user of the community of users, based on a viewing history of content items for the user, a group of user interest clusters selected from the set of interest based clusters for the community of users. For example, recommendation system 140 may determine, for user 132*a* of the community of users, based on a viewing history 321 of content items for user 132*a*, a group of user interest clusters 313 selected from the set of interest based clusters 145. In some embodiments, an interest based cluster, such as C1, of the set of interest based clusters 145 can be selected to become a user interest cluster 323*a* and placed into the group of user interest clusters 313, where user interest cluster 323*a* can be the same as interest based cluster C1. In some embodiments, interest based cluster C2 can be further filtered to remove content items that are less related to viewing history 321 for user 132*a*, and resulting in the user interest cluster 323*b*. As shown in FIG. 3, user interest cluster 323*a* may include multiple content items, M31, M32, M33, or more. User interest cluster 323*a* or 323*b* can be stored in media device 106 and displayed on display device 108.

In some embodiments, at 410, recommendation system 140 may select one or more recommendation candidates 147 for user 132*a* based on the interest based popularity score 331 of the content item for each content item in the group of user interest clusters 313. In some embodiments, recommendation system 140 can select at most a first number of content items from a first user interest cluster 323a based on an interest based popularity score 331 of a content item in the first user interest cluster 323a, and at most a second number of content items from a second user interest cluster 323b based on an interest based popularity score 331 of a content item in the second user interest cluster 323b, and select the one or more recommendation candidates 147 from a group of content items including the first number of content items from the first user interest cluster 323a and the second number of content items from the second user interest cluster 323b. In some embodiments, recommendation system 140 can select the one or more recommendation candidates 147 from the group of content items based on popularity scores 311 of the group of content items.

In some embodiments, recommendation system 140 may select at most a number of content items from a user interest cluster, such as user interest cluster 323a or 323b, where a first selected content item and a second selected content item have a similarity score higher than a predetermined threshold, and further select the one or more recommendation candidates 147 based on the number of content items from the user interest cluster 323a or 323b. In some embodiments, the similarity score 308 includes a similarity score obtained based on content item embedding, and the similarity score between the first selected content item and the second selected content item represents a likely possibility for a user to display the first selected content item as well as the second selected content item.

In some embodiments, recommendation system 140 may select the one or more recommendation candidates 147 based on the interest based popularity score 331 with the following two models (a) or (b).
(a) based on the group of user interest cluster 313 (including clusters A1, . . . , An) to pick top K items from each user interest cluster 323 and pick up top L items based on popularity score for each content item, where K and L are two symbols representing two integers.
(b) for existing mixed candidate, performing the following operations:
  (i) define a threshold alpha as a threshold for measuring similarity
  (ii) repeat
  (iii) select the item which is not selected into other clusters A1, . . . , An
  (iv) add it as a new cluster Ai
    find all other items which has been selected with a similarity score less than the threshold alpha to the new cluster Ai
  (v) until all items are selected
  (vi) selecting candidates according to (a).

Example Computer System

Figure 5:
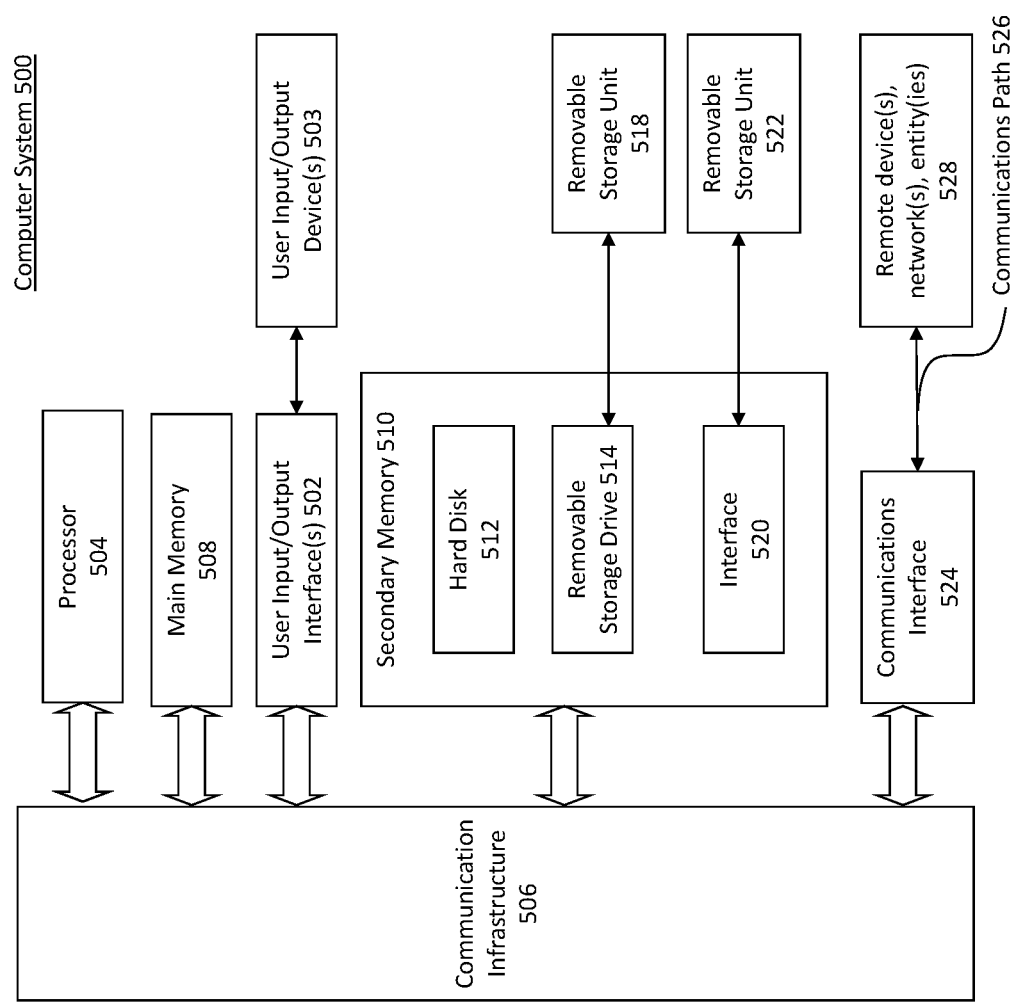
FIG. 5 illustrates an example computer system useful for implementing various embodiments.

Various embodiments may be implemented, for example, using one or more well-known computer systems, such as computer system 500 shown in FIG. 5. For example, media device 106, display device 108, content server 120, system server 126, may be implemented using combinations or sub-combinations of computer system 500 to perform various functions described herein, e.g., by process 400 performed by recommendation system 140. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models, e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for user interest based recommendation, comprising:

generating, by one or more computer processors of one or more servers of a streaming media content delivery system, a set of interest based clusters for a set of content items corresponding to a set of interests for a community of users of the streaming media content delivery system, wherein an interest based cluster of the set of interest based clusters includes a subset of content items corresponding to an interest of the set of interests;

generating, by the one or more computer processors of the one or more servers, a popularity score for each content item of the set of content items with respect to the community of users;

generating, by the one or more computer processors of the one or more servers, a rank for a content item of the subset of content items of the interest based cluster based on the popularity score of the content item, wherein the rank of the content item represents an interest based popularity score within the interest based cluster;

determining, by the one or more computer processors of the one or more servers, for a user of the community of users, based on a viewing history of content items for the user, a group of user interest clusters selected from the set of interest based clusters for the community of users, the group of user interest clusters comprising the interest based cluster;

selecting one or more recommendation candidates for the user based on the interest based popularity score of the content item for each content item in the group of user interest clusters; and presenting one or more of the selected one or more recommendation candidates as user-selectable options via a user interface of a media device of the streaming media content delivery system communicatively coupled to the one or more servers of the streaming media content delivery system.

2. The computer-implemented method of claim 1, wherein the set of interests includes an interest defined based on a genre of the content item, a sub-genre of the content item, or information related to music, education, location, culture, age, or social factors of the content item.

3. The computer-implemented method of claim 1, wherein the content item is included in two different interest based clusters.

4. The computer-implemented method of claim 1, wherein the popularity score of the content item with respect to the community of users is defined based on a total streaming time by the community of users, a total number of displays by the community of users, a total number of clicks by the community of users, or a number of reaches for the content item by the community of users.

5. The computer-implemented method of claim 1, wherein the presenting the one or more of the selected one or more recommendation candidates comprises:

displaying, on a display device to the user, a first subset of content items of a first interest based cluster; and displaying a second subset of content items of a second interest based cluster adjacent to the first interest based cluster, wherein the first interest based cluster and the second interest based cluster belong to a same genre.

6. The computer-implemented method of claim 1, wherein the selecting the one or more recommendation candidates for the user comprises:

selecting at most a first number of content items from a first user interest cluster based on an interest based popularity score of a content item in the first user interest cluster, and at most a second number of content items from a second user interest cluster based on an interest based popularity score of a content item in the second user interest cluster; and selecting the one or more recommendation candidates from a group of content items including the first number of content items from the first user interest cluster and the second number of content items from the second user interest cluster.

7. The computer-implemented method of claim 6, wherein the selecting the one or more recommendation candidates from the group of content items comprises:

selecting the one or more recommendation candidates from the group of content items based on popularity scores of the group of content items.

8. The computer-implemented method of claim 1, wherein the selecting the one or more recommendation candidates for the user comprises:

selecting at most a number of content items from a user interest cluster, wherein a first selected content item and a second selected content item has a similarity score higher than a predetermined threshold; and selecting the one or more recommendation candidates based on the number of content items from the user interest cluster.

9. The computer-implemented method of claim 8, wherein the similarity score includes a similarity score obtained based on item embedding, and the similarity score between the first selected content item and the second selected content item represents a likely possibility for a user to display the first selected content item as well as the second selected content item.

10. The computer-implemented method of claim 1, wherein the generating the set of interest based clusters for the set of content items corresponding to the set of interests for the community of users comprises generating the set of interest based clusters offline, and wherein the set of interest based clusters is stored in a storage device.

11. A computing device configured as a server of a streaming media content delivery system, comprising:

a communication interface configured to enable communications between the server of the streaming media content delivery system and a media device of the streaming media content delivery system, the media device including or coupled to a display device; and at least one processor coupled to the communication interface and configured to:

generate a set of interest based clusters for a set of content items corresponding to a set of interests for a community of users of the streaming media content delivery system, wherein an interest based cluster of the set of interest based clusters includes a subset of content items corresponding to an interest of the set of interests;

generate a popularity score for each content item of the set of content items with respect to the community of users;

generate a rank for a content item of the subset of content items of the interest based cluster based on the popularity score of the content item, wherein the rank of the content item represents an interest based popularity score within the interest based cluster;

determine, for a user of the community of users, based on a viewing history of content items for the user, a group of user interest clusters selected from the set of interest based clusters for the community of users, the group of user interest clusters comprising the interest based cluster;

select one or more recommendation candidates for the user based on the interest based popularity score of the content item for each content item in the group of user interest clusters; and transmitting, via the communication interface, to the media device, one or more of the one or more selected recommendation candidates for presentation on the display device to the user as user-selectable options via a user interface of the media device.

12. The computing device of claim 11, wherein the set of interests includes an interest defined based on a genre of the content item, a sub-genre of the content item, or information related to music, education, location, culture, age, or social factors of the content item.

13. The computing device of claim 11, wherein the popularity score of the content item with respect to the community of users is defined based on a total streaming time by the community of users, a total number of displays by the community of users, a total number of clicks by the community of users, or a number of reaches for the content item by the community of users.

14. The computing device of claim 11, wherein the media device is configured to present the one or more of the one or more selected recommendation candidates by:

displaying, on the display device to the user, a first subset of content items of a first interest based cluster; and displaying a second subset of content items of a second interest based cluster adjacent to the first interest based cluster, wherein the first interest based cluster and the second interest based cluster belong to a same genre.

15. The computing device of claim 11, wherein to select the one or more recommendation candidates for the user, the at least one processor is configured to:

select at most a first number of content items from a first user interest cluster based on an interest based popularity score of a content item in the first user interest cluster, and at most a second number of content items from a second user interest cluster based on an interest based popularity score of a content item in the second user interest cluster; and select the one or more recommendation candidates from a group of content items including the first number of content items from the first user interest cluster and the second number of content items from the second user interest cluster.

16. The computing device of claim 15, wherein to select the one or more recommendation candidates from the group of content items, the at least one processor is configured to:

select the one or more recommendation candidates from the group of content items based on popularity scores of the group of content items.

17. The computing device of claim 11, wherein to select the one or more recommendation candidates for the user, the at least one processor is configured to:

select at most a number of content items from a user interest cluster, wherein a first selected content item and a second selected content item has a similarity score higher than a predetermined threshold; and select the one or more recommendation candidates based on the number of content items from the user interest cluster.

18. The computing device of claim 17, wherein the similarity score includes a similarity score obtained based on item embedding, and the similarity score between the first selected content item and the second selected content item represents a likely possibility for a user to display the first selected content item as well as the second selected content item.

19. A non-transitory computer-readable medium having instructions stored thereon that, when executed by at least a computing device of a server of a streaming media content delivery system, cause the computing device to perform operations comprising:

generating a set of interest based clusters for a set of content items corresponding to a set of interests for a community of users of the streaming media content delivery system, wherein an interest based cluster of the set of interest based clusters includes a subset of content items corresponding to an interest of the set of interests;

generating a popularity score for each content item of the set of content items with respect to the community of users;

generating a rank for a content item of the subset of content items of the interest based cluster based on the popularity score of the content item, wherein the rank of the content item represents an interest based popularity score within the interest based cluster;

determining, for a user of the community of users, based on a viewing history of content items for the user, a group of user interest clusters selected from the set of interest based clusters for the community of users, the group of user interest clusters comprising the interest based cluster;

selecting one or more recommendation candidates for the user based on the interest based popularity score of the content item for each content item in the group of user interest clusters; and transmitting, to a media device of the streaming media content delivery system, one or more of the one or more recommendation candidates for presentation as user-selectable options via a user interface of the media device.

20. The non-transitory computer-readable medium of claim 19, wherein the set of interests includes an interest defined based on a genre of the content item, a sub-genre of the content item, or information related to music, education, location, culture, age, or social factors of the content item; and wherein the popularity score of the content item with respect to the community of users is defined based on a total streaming time by the community of users, a total number of displays by the community of users, a total number of clicks by the community of users, or a number of reaches for the content item by the community of users.

* * * * *